(12) United States Patent
Gan et al.

(10) Patent No.: US 11,138,863 B2
(45) Date of Patent: Oct. 5, 2021

(54) VEHICLE CONDITION REMINDING SYSTEM AND METHOD

(71) Applicant: Sky Light Electronic (Shenzhen) Limited Corporation, Shenzhen (CN)

(72) Inventors: Weijun Gan, Shenzhen (CN); Wing Fong Terry Tang, Shenzhen (CN)

(73) Assignee: Sky Light Electronic (Shenzhen) Limited Corporation, Shenzhen (CN)

( * ) Notice: Subject to any disclaimer, the term of this patent is extended or adjusted under 35 U.S.C. 154(b) by 0 days.

(21) Appl. No.: 16/962,669

(22) PCT Filed: Jan. 26, 2018

(86) PCT No.: PCT/CN2018/074331
§ 371 (c)(1),
(2) Date: Jul. 16, 2020

(87) PCT Pub. No.: WO2019/144381
PCT Pub. Date: Aug. 1, 2019

(65) Prior Publication Data
US 2020/0365006 A1    Nov. 19, 2020

(51) Int. Cl.
*G08B 21/24* (2006.01)
*H04W 4/40* (2018.01)
*H04W 4/02* (2018.01)

(52) U.S. Cl.
CPC ............ *G08B 21/24* (2013.01); *H04W 4/023* (2013.01); *H04W 4/40* (2018.02)

(58) Field of Classification Search
None
See application file for complete search history.

(56) References Cited

U.S. PATENT DOCUMENTS

| | | | |
|---|---|---|---|
| 6,774,764 B2 | 8/2004 | Ghosh et al. | |
| 2002/0024460 A1 | 2/2002 | Ghosh et al. | |
| 2015/0138818 A1* | 5/2015 | Salter | H05B 47/115 |
| | | | 362/510 |
| 2017/0247015 A1* | 8/2017 | Davis | G08B 21/0205 |

FOREIGN PATENT DOCUMENTS

| | | |
|---|---|---|
| CN | 103234550 | 8/2013 |
| CN | 105235634 | 1/2016 |
| CN | 105630171 | 6/2016 |
| CN | 105897877 | 8/2016 |
| CN | 107124343 | 9/2017 |
| WO | WO PCT/CN2018/074331 | 10/2018 |

* cited by examiner

*Primary Examiner* — Thomas S McCormack
(74) *Attorney, Agent, or Firm* — Wells St. John P.S.

(57) ABSTRACT

A vehicle condition reminding method includes the following steps: detecting the vehicle condition of the vehicle; and when the user leaves the vehicle by at least a predetermined distance and the vehicle condition is abnormal, the user is reminded of the abnormal vehicle condition. When the user leaves the vehicle a certain distance, the vehicle condition reminding system can give her/him a reminding device, so that the user can know the abnormal vehicle conditions in the vehicle in time, and can return to the vehicle within a short time to process and resolve these abnormal vehicle conditions.

22 Claims, 2 Drawing Sheets

VEHICLE CONDITION REMINDING SYSTEM AND METHOD

RELATED PATENT DATA

This application is a 35 U.S.C. § 371 of and claims priority to PCT International Application No. PCT/CN2018/074331, filed 26 Jan. 2018, the teachings of which are incorporated herein by reference.

TECHNICAL FIELD

The invention belongs to the field of automobile information equipment, and particularly to a system and method for communication between a vehicle and other equipment.

BACKGROUND

Most commercial and personal vehicles appeared in the market are equipped with vehicle condition detecting systems. For example, on the dashboard in front of the driver's seat, there are various indicators to indicate various conditions of the vehicle. Common conditions include that one or more doors are not closed, the headlights are not turned off, and the handbrake is not pulled properly. These conditions are determined by analyzing data detected by various sensors inside the vehicle, and the indicator lights allow the driver to know the various abnormal conditions of the vehicle when driving the vehicle or being at the interior of the vehicle, and to carry out corresponding operations to avoid unnecessary energy consumption or causing potential safety hazards.

However, in the prior art, there is a lack of a solution that still gets a warning about the abnormal vehicle condition after the driver leaves the vehicle. After leaving the vehicle for a short distance, the driver cannot or is inconvenient to understand and handle the vehicle condition in time, but may just walk away. Such walking away disregarded will lead to potential safety hazards for the vehicle. For example, if the door is not closed properly, the window glass is not raised, or the handbrake is not pulled properly, etc., it may cause theft risk or endanger the vehicle itself.

SUMMARY

Therefore, in one aspect, embodiments of the invention provide a vehicle condition reminding method which includes the following steps: detecting a vehicle condition of a vehicle; and when a user leaves the vehicle by at least a predetermined distance, and when the vehicle condition is abnormal, reminding the user of the abnormal vehicle condition.

Preferably, the detecting step is performed by a vehicle condition detecting device provided in the vehicle.

In a specific embodiment, the vehicle condition detecting device is 1) an independent detecting device externally connected to an OBD interface of the vehicle, 2) a vehicle driving computer, or 3) an on-board safety device.

In another specific embodiment, determining whether the vehicle condition is abnormal is performed by the vehicle condition detecting device.

In another specific embodiment, determining whether the vehicle condition is abnormal is performed by a reminding device adapted to be carried by the user through receiving the vehicle condition information sent by the vehicle condition detecting device in a wireless communication manner.

In a variation of the preferred embodiment, in the reminding step, a reminding device adapted to be carried by the user sends a warning based on that the user leaves the vehicle by at least a predetermined distance and the vehicle condition is abnormal.

In another variation of the preferred embodiment, determining whether the user leaves the vehicle by at least a predetermined distance is performed by a vehicle condition detecting device provided in the vehicle through wireless communicating with a reminding device adapted to be carried by the user.

In another variation of the preferred embodiment, determining whether the user leaves the vehicle by at least a predetermined distance is performed by a reminding device adapted to be carried by the user through wireless communicating with a vehicle condition detecting device.

In another variation of the preferred embodiment, the abnormal vehicle condition includes one or more vehicle conditions selected from the group consisting of: one or more doors are not closed, the trunk is not tightly closed, the sunroof is not fully closed, one or more lights are not turned off, the engine is not turned off, one or more windows are not fully raised, and the handbrake is not pulled properly.

In another variation of the preferred embodiment, the reminding device is a vehicle remote key, a key fob, or a smart terminal.

In another aspect of the invention, a vehicle condition reminding system is provided which includes a vehicle condition detecting device adapted to connect to a vehicle, and a reminding device adapted to be carried by a user. The reminding device is adapted to wirelessly communicate with an on-board safety device. The reminding device is configured to send a warning to the user when receiving or determining that the vehicle condition is abnormal, and that the reminding device leaves the vehicle by at least a predetermined distance.

Preferably, the vehicle condition detecting device is 1) an independent detecting device externally connected to an OBD interface of the vehicle, 2) a vehicle driving computer, or 3) an On-Board safety device.

In a specific embodiment, the vehicle condition detecting device is configured to detect the vehicle condition of the vehicle, determine whether the vehicle condition is abnormal, and send a vehicle condition abnormal signal to the reminding device.

In another specific embodiment, the vehicle condition detecting device is configured to detect the vehicle condition of the vehicle and send vehicle condition information to the reminding device. The reminding device determines whether the abnormal vehicle condition occurs through receiving the vehicle condition information sent by the vehicle condition detecting device.

In another specific embodiment, the vehicle condition detecting device determines whether the user leaves the vehicle by at least a predetermined distance through wirelessly communicating with the reminding device.

In a variation of the preferred embodiment, the reminding device determines whether the user leaves the vehicle by at least a predetermined distance through wirelessly communicating with the vehicle condition detecting device.

In another variation of the preferred embodiment, the abnormal vehicle condition includes one or more vehicle conditions selected from the group consisting of: one or more doors are not closed, the trunk is not tightly closed, the sunroof is not fully closed, one or more lights are not turned off, the engine is not turned off, one or more windows are not fully raised, and the handbrake is not pulled properly.

In another variation of the preferred embodiment, the reminding device does not have a user input device.

In another variation of the preferred embodiment, the reminding device does not have the ability to join a mobile phone network or Wi-Fi.

In another variation of the preferred embodiment, the reminding device is a vehicle remote key, a key fob, or a smart terminal.

In another aspect of the invention, a vehicle condition reminding system is provided, including a vehicle condition detecting device adapted to connect to a vehicle, and a reminding device adapted to be carried by the user. The reminding device is adapted to wirelessly communicate with an on-board safety device, and the reminding device is configured to send a warning to the user when the receiving or determining that the vehicle condition is abnormal. The reminding device does not have a user input device, or the reminding device does not have the ability to access the mobile phone network.

In another aspect of the invention, a reminding apparatus is provided, including a reminding device adapted to be carried by a user. The reminding device is adapted to receive or determine information sent by a vehicle condition detecting device connected to a vehicle through wireless communicating, and is adapted to send a warning to the user. The reminding device does not have a user input device, or the reminding device does not have the ability to join a mobile phone network.

Preferably, the reminding device is configured to send a warning to the user when receiving or determining that the vehicle condition is abnormal, and the reminding device leaves the vehicle by at least a predetermined distance.

In a specific embodiment, the reminding device determines whether the user leaves the vehicle by a predetermined distance through wireless communication between the reminding device and the vehicle condition detecting device.

In another specific embodiment, the abnormal vehicle condition includes one or more vehicle conditions selected from the group consisting of: one or more doors are not closed, the trunk is not tightly closed, the sunroof is not fully closed, one or more lights are not turned off, the engine is not turned off, one or more windows are not fully raised, and the handbrake is not pulled properly.

Therefore, the invention provides many benefits. Firstly, the vehicle condition reminding system provided by the invention can promptly and conveniently provide users with a warning about abnormal vehicle condition. Although such a warning can be sent to the user at any time (for example, when the user is in the vehicle), what is more important is that when the user leaves the vehicle by a certain distance, the vehicle condition reminding system can send a warning to her/him, so that the user could know about the abnormal vehicle condition in the vehicle in time, and she/he can return to the vehicle in a short time to process and solve the abnormal vehicle condition. Such a short-distance reminding function could prevent the user from discovering abnormal vehicle conditions after leaving the vehicle for a long time or a long distance, thereby saving the user's time and allowing hidden troubles caused by the abnormal vehicle conditions to be addressed in time.

On the other hand, the vehicle condition reminding system in the invention has deployment flexibility. If the vehicle is a completely new design, the vehicle condition detecting device of the vehicle condition reminding system of the invention can be integrated (pre-installed) on the vehicle, such as an on-board computer or an on-board safety device of the vehicle itself, and can be integrally connected to other components of the vehicle including a bus, etc., so that once the user purchases the vehicle, the user can directly use the reminding device to communicate with the vehicle (through the vehicle condition detecting device) without any other configuration or installation work. Alternatively, the invention is also applicable as a device that can be purchased separately by the vehicle owner and then connected by the user to an existing vehicle. In other words, vehicle owners can easily purchase a vehicle condition reminding system and then use it on vehicles they already own. In this case, only the independent vehicle condition detecting device and other related components need to be connected to the vehicle's electronic system, for example through the OBD interface, and then the user can use the reminding device to get a warning about the abnormal vehicle condition. This installation is very simple, does not require the user to have professional knowledge, and does not require any changes to the interior or structure of the original vehicle, so it can help the vehicle owner to easily add new functions to the vehicle.

In addition, one aspect of the invention provides a low-cost, reliable reminding device solution. Users do not need to use personal mobile terminals with complex computing and communication capabilities to implement reminding functions, such as smart phones, tablet computers, or smart watches. On the contrary, in the simplest embodiment, the user only needs a reminding device similar to a key fob. In theory, such a reminding device only needs to have a short-distance signal receiving function, and does not need a complicated sending function, and the reminding device could remind the user by a simple method such as sound/flash. This design allows the cost of the reminding device to be reduced without the need for powerful computing or storage functions. It should be noted that the above advantages do not mean that the invention cannot be applied to a smart phone, a tablet computer, or a smart watch. On the contrary, the invention can be fully applied to these smart devices as long as they have corresponding receiving functions. In addition to the short-range communication receiving function, the invention can also be applied to other wireless communication methods, such as mobile phone networks, WiMax, and so on.

BRIEF DESCRIPTION OF THE DRAWINGS

The performance and advantages of the invention can be further understood with reference to the rest of the specification and the drawings. The same components in these drawings have the same reference numerals. In some cases, sub-marks are placed after a label and a hyphen to indicate one of many similar components. When a label is mentioned but no specific sub-mark is specified, it refers to all these similar components.

FIG. 3 shows a flowchart of a vehicle condition reminding method according to another embodiment of the invention.

FIG. 4 shows a flowchart of a vehicle condition reminding method according to another embodiment of the invention.

FIG. 5 shows a flowchart of a vehicle condition reminding method according to another embodiment of the invention.

FIG. 6 shows a flowchart of a vehicle condition reminding method according to another embodiment of the invention.

DETAILED DESCRIPTION

Embodiments of the invention use a short-distance wireless communication method to enable a reminding device carried by a user to promptly remind the user about abnormal vehicle conditions. The different benefits and advantages provided by various embodiments of the invention can be easily understood from the following description.

Figure 1:
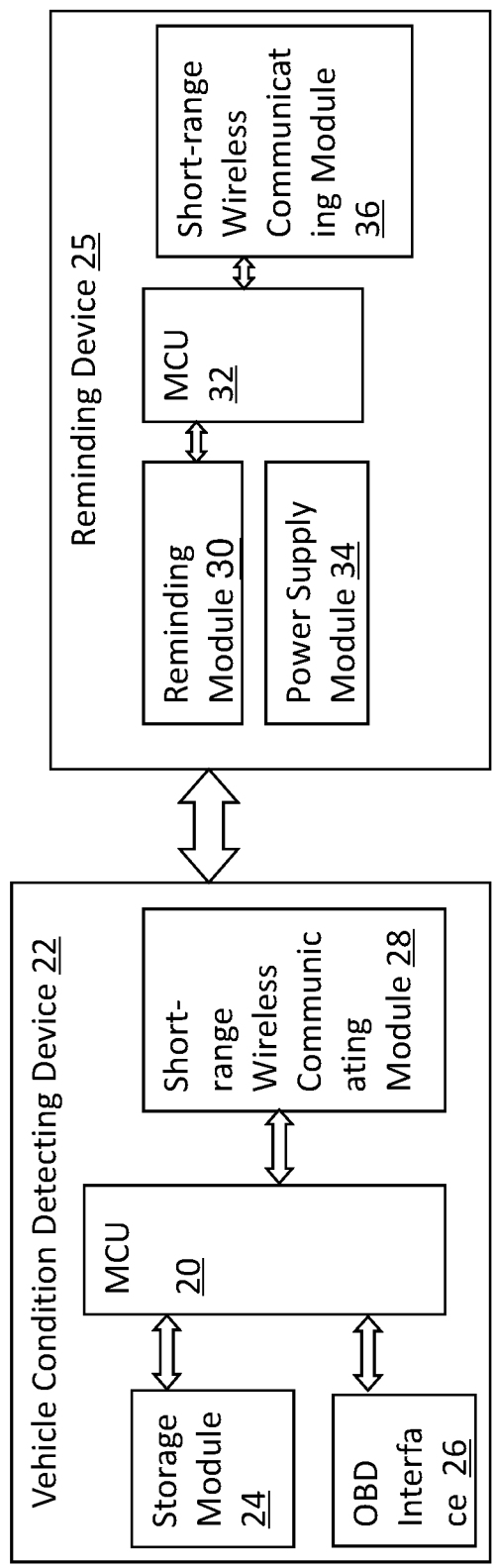
FIG. 1 shows a structural block diagram of a vehicle condition reminding system according to a first embodiment of the invention.

Firstly, turning to FIG. 1, the vehicle condition reminding system in the first embodiment of the invention includes two portions, namely a vehicle condition detecting device 22 and a reminding device 25. The vehicle condition detecting device 22 is installed inside a vehicle (not shown), and the reminding device 25 is a portable device that can be carried by the user. The vehicle condition detecting device 22 may be externally connected to the vehicle as a separate device, or may be a module integrated in the vehicle itself. In the former case, the vehicle condition detecting device 22 may be an independent additional device, which is purchased separately by the user on the market, and then installed into the interior of the vehicle, such as to the panel of the driver's seat, or it may be installed by a professional in a place the user can not normally access, such as under the panel or inside the engine compartment. Such an additional device is particularly suitable for users to add functions to existing vehicles, that is to say, the on-board safety device can be backward compatible with earlier-produced vehicles. In this case, the vehicle condition detecting device 22 is connected to the vehicle through an OBD interface 26 of the vehicle and an On-Board Diagnostics (abbreviated as OBD) of the vehicle. OBD is a system installed in the vehicle to monitor the running status of the vehicle and report abnormalities. By collecting the output signals of various sensors on the vehicle, the fault diagnosis and information transmission are processed centrally according to certain protocols and standards. An OBD system and sensors together constitute the vehicle condition detecting device on the vehicle. OBD is an international standard. So far, the major auto companies in the world have basically adopted OBD. Due to the unification of standards, it is possible to use a standard diagnostic instrument to inspect and repair vehicles of different brands and models. Therefore, through the OBD interface 26, the vehicle condition detecting device 22 can be applied to most vehicles of different brands that have been put on the market, and can also be applied to vehicles that have not been put on the market. The vehicle condition detecting device 22 does not need to consider the differences in bus protocols or computer formats in vehicles of different brands, but can read the vehicle condition abnormal information in a standardized manner. The OBD interface 26 may be, for example, an OBD-II data connection port used by current mainstream automobile manufacturers, which has 16 pins and can be connected and communicated with corresponding OBD interfaces on vehicles of different brands.

If the vehicle condition detecting device 22 is an integrated module of the vehicle itself, the vehicle condition detecting device 22 can be directly manufactured by the automobile manufacturer as a part of the vehicle, such as an on-board safety device and an on-board computer, and can use the antenna of the vehicle itself to realize signal transmission, etc. It should be understood that whether the vehicle condition detecting device is externally connected to the vehicle as a separate device or as a module integrated in the vehicle itself does not affect the function of the vehicle condition detecting device 22 in the embodiment in FIG. 1.

The vehicle condition detecting device 22 also has an MCU 20 that is connected to a storage module 24 and a short-range wireless communicating module 28. The MCU 20 is used to perform calculations and processing, for example, to encrypt, integrate, and encode the abnormal vehicle condition signal related to the vehicle read from the OBD interface 26. The storage module 24 is used to permanently or temporarily store data processed by the MCU 20 or firmware required for normal operation of the vehicle condition detecting device 22. The short-range wireless communicating module 28 is used to send a signal about abnormal vehicle conditions to the reminding device 25. The short-range wireless communicating module 28 is adapted to send signals using various suitable formats, including but not limited to WiFi, Zigbee, Bluetooth, NB-IoT, eMTC, LoRa, and so on.

The appearance of the reminding device 25 is not shown in FIG. 1, but the reminding device 25 may have any convenient shape. In one example, the reminding device 25 may have the shape of an ordinary vehicle remote control key, and may be attached to the key ring. Or the reminding device 25 may have the shape of a key fob. The reminding device 25 has an MCU 32, which functions similarly to the MCU 20 of the vehicle condition detecting device 22. It should be noted that the MCU 32 of the reminding device 25 can also process and determine the data. For example, as will be described in more detail below, in some embodiments the reminding device 25 may receive vehicle condition data from the vehicle condition detecting device 22, and the processing and analysis of such raw data is performed by the reminding device 25. The reminding device 25 is powered by the power module 34, which supplies power to the various components shown in FIG. 1. The short-range wireless communicating module 36 is connected to the MCU 32 and can communicate with the short-range wireless communicating module 28 in the vehicle condition detecting device 22. However, the two need not be identical. For example, the short-range wireless communicating module 28 in the vehicle condition detecting device 22 may have a larger transmission power, and the short-range wireless communicating module 36 of the reminding device 25 does not require such a large transmission power. In addition, in terms of achieving the object of the invention, the short-distance wireless communicating module 28 in the vehicle condition detecting device 22 mainly serves the function of information transmission, and the short-distance wireless communicating module 36 of the reminding device 25 mainly serves the function of information reception. The information received by the reminding device 25 herein includes but is not limited to vehicle condition data sent by the vehicle condition detecting device 22 or information about abnormal vehicle conditions sent by the vehicle condition detecting device 22. The reminding module 30 is connected to the MCU 32 and is used to send a warning to the user about abnormal vehicle conditions. The reminding module 30 may send a visual and/or audible warning, for example, the reminding module 30 may include a buzzer or include an LED.

Figure 2:
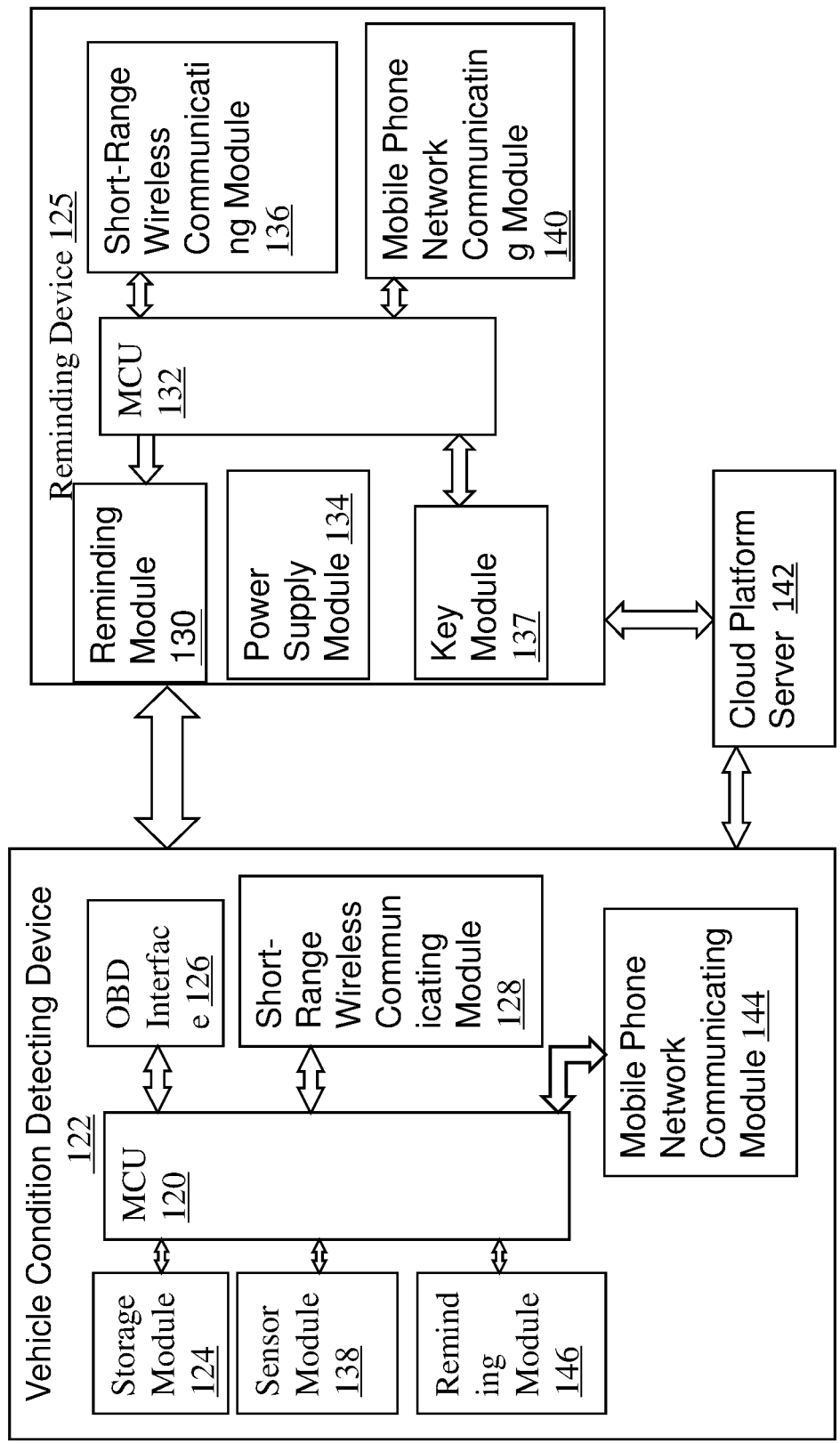
FIG. 2 shows a structural block diagram of a vehicle condition reminding system according to another embodiment of the invention.

Now, turning to FIG. 2, the vehicle condition reminding system in another embodiment shown in FIG. 2 is different from that in FIG. 1. For simplicity of description, the same or similar components in FIG. 2 as in FIG. 1 will not be described in detail. In the vehicle condition detecting device 122 of FIG. 2, in addition to the storage module 124, the OBD interface 126, and the short-range wireless communicating module 128 that are respectively connected to the MCU 122, a sensor module 138, a mobile phone network communicating module 144, and a reminding module 146 are also connected to MCU 122. The sensor module 138 is a separate sensor belonging to the vehicle condition reminding system, and does not belong to other vehicle components or systems. The number of sensor modules 138 may be one (as shown in FIG. 2) or more. The sensor module 138 may include a gravity sensor unit, a shock sensor unit, a tilt sensor unit, a three-dimensional angular velocity sensor unit, a displacement sensor unit, and the like. The sensor module 138 is used to separately collect information about the vehicle for the vehicle condition detecting device 122. Such information may not be collected by a sensor provided by a general vehicle, for example, information specifically related to vehicle anti-theft. In addition, the mobile phone network communicating module 144 enables the vehicle condition detecting device 122 to obtain the ability to access a mobile phone network (e.g., 3G, 4G, or 5G network). The function of the reminding module 146 is similar to the function of the reminding module described above in FIG. 1, and is used to send a visual/audible warning to the user about abnormal vehicle conditions. The difference is that the reminding module 146 in FIG. 2 is part of the vehicle condition detecting device 122, which means that it is located inside the vehicle. Therefore, the reminding module 146 is used to provide a warning to the user when the user is inside the vehicle.

The structure of the reminding device 125 is similar to the structure of the reminding device described above in FIG. 1, and the power supply module 134 provides power. In the reminding device 125, the MCU 132 is connected to the mobile phone network communicating module 140 and the key module 137 in addition to the reminding module 130 and the short-range wireless communicating module 136. The mobile phone network communicating module 140 enables the reminding device 125 to obtain the ability to join a mobile phone network (e.g., 3G, 4G, or 5G network). The key module 137 includes virtual (e.g., touch screen) or physical keys to facilitate user input. For example, the key module 137 may include keys such as lock and unlock of the vehicle door, light switch, and window lift, so that the user can remotely control certain functions of the vehicle without returning to the vehicle to eliminate potential safety hazards.

Since the vehicle condition detecting device 122 and the reminding device 125 in FIG. 2 have mobile phone network communicating modules 144 and 140 respectively, the vehicle condition detecting device 122 and the reminding device 125 can communicate with each other through the mobile phone network. A cloud platform server 142 is shown in FIG. 2, which is connected to mobile phone network communicating modules 144 and 140, respectively. The mobile phone network communicating module may be a common 3G/4G communicating module such as a GPRS communicating module, a WCDMA data communicating module, a CDMA2000 communicating module, a TD/SCDMA communicating module, an LTE communicating module, an FDD communicating module, and a TDD communicating module, etc. In addition, the mobile phone network communicating module may also be a communicating module supporting a 5G network. Through the cloud platform server 142, the reminding device 125 can receive the information about the abnormal vehicle condition sent by the vehicle condition detecting device 122. In addition, the reminding device 125 may also send the instruction input by the user (through the key module 137) to the vehicle condition detecting device 122 through the cloud platform server 142 to control the vehicle. It should be noted that in the embodiment of FIG. 2, it is not necessary that the vehicle condition detecting device 122 and the reminding device 125 have mobile phone network communicating modules 144 and 140, respectively, but only as an alternative communication method. The short-range wireless communicating modules 128 and 136 can also complete the communication between the on-board safety device 122 and the reminding device 125.

Now, turning to FIG. 3, a flowchart of a vehicle condition reminding method according to an embodiment of the invention is shown here. It should be noted that the method of this embodiment can be used for vehicle condition reminding systems with different hardware or structures, including but not limited to the two vehicle condition reminding systems shown in FIG. 1 and FIG. 2. Specifically, at the beginning of the method, in Step 250 the vehicle condition detecting device firstly collects the vehicle condition data of the vehicle to which it is installed and stores the data. This data collection is real-time. It should be noted that the vehicle condition detecting device can collect these data in different ways. For example, the vehicle condition detecting device can access and acquire vehicle condition data from the vehicle's OBD system through the OBD interface (such as the one introduced in the embodiment described above in FIG. 1). Alternatively, the vehicle condition detecting device may also collect vehicle condition the information about the vehicle through a sensor attached thereto (for example, the sensor module 138 in FIG. 2). Then, in Step 252, the MCU of the vehicle condition detecting device analyzes the collected vehicle condition data in real time and processes it. Next, in Step 254 the vehicle condition detecting device determines whether the vehicle condition is abnormal, and at the same time, the vehicle condition detecting device also determines whether the reminding device carried by the user has left the vehicle by a predetermined distance. The steps for detecting the abnormal vehicle conditions include: detecting the current vehicle condition data in real time, comparing and analyzing the detected current vehicle condition data with normal standard data, and determining whether the current vehicle condition is an abnormal vehicle condition according to the analysis result. The determination of the distance between the reminding device and the vehicle (that is, the vehicle condition detecting device) can be performed by the vehicle condition detecting device using various known methods. If in Step 254 both the vehicle condition detecting device determines that the vehicle condition is abnormal, and the distance between the reminding device and the vehicle has exceeded a predetermined value, then the method proceeds to Step 256. In Step 256, the vehicle condition detecting device notifies the reminding device to act, and the reminding device promptly reminds the user of the abnormal vehicle condition visually or audibly according to the vehicle condition abnormal signal, for example, through the reminding module introduced in FIGS. 1 and 2. However, if in Step 254 the vehicle condition detecting device determines that at least one of the two conditions that the vehicle condition is abnormal and the distance between the reminding device and the vehicle has exceeded a predetermined value is not satisfied, then the method returns to Step 252, that is, the vehicle condition detecting device continues process and monitor the vehicle condition data, and the reminding device will not remind the user. Through the above methods, it can be guaranteed that the reminding device will only send a warning when there are abnormal vehicle conditions and simultaneously the owner is far away from the vehicle (for example, 100 meters), to avoid unnecessary nuisance to the owner when it is still in the vehicle, but it can also ensure that the owner is notified of abnormal conditions in a timely manner when the owner is not too far away from the vehicle.

Turning to FIG. 4, a vehicle condition reminding method according to another embodiment of the invention is shown, which is slightly different from the method shown in FIG. 3. It should be noted that the method of this embodiment can be used for vehicle condition reminding systems with different hardware or structures, including but not limited to the two vehicle condition reminding systems shown in FIG. 1 and FIG. 2. Specifically, Steps 350, 352, and 356 in FIG. 4 are substantially the same as Steps 250, 252, and 256 in FIG. 3, respectively. However, in Step 354 in FIG. 4, the determination of the distance between the vehicle (vehicle condition detecting device) and the reminding device is performed by the reminding device rather than the vehicle condition detecting device. For example, the strength of the radio signal from the vehicle condition detecting device received by the reminding device may be used as a reference for determining the distance between the reminding device and the vehicle. In an example embodiment, the reminding device is configured to continuously receive the abnormal vehicle condition signal from the vehicle condition detecting device, and when the strength of the abnormal vehicle condition signal is less than a predetermined value, it is determined that the reminding device has been left the vehicle by at least a predetermined distance. In Step 354, if the reminding device determines that the user has been left the vehicle by at least a predetermined distance, and the vehicle condition detecting device also detects that the vehicle condition is abnormal, the method will proceed to Step 356. Otherwise, the method will return to Step 352.

Turning to FIG. 5, a vehicle condition reminding method according to another embodiment of the invention is shown. It should be noted that the method of this embodiment can be used for vehicle condition reminding systems with different hardware or structures, including but not limited to the two vehicle condition reminding systems shown in FIG. 1 and FIG. 2. Specifically, Steps 450 and 456 in FIG. 5 are substantially the same as Steps 350 and 356 in FIG. 4, respectively. However, the main data analysis and processing in the method shown in FIG. 5 is performed by the reminding device rather than the vehicle condition detecting device. Specifically, after the vehicle condition detecting device collects the vehicle condition data about the vehicle in Step 450, the data information is directly sent to the reminding device in Step 451 instead of being analyzed and processed by itself. Next, in Step 453, the MCU of the reminding device receives the data information sent by the vehicle condition detecting device, and processes and analyzes it in real time. Next, in Step 454, the reminding device determines whether the vehicle has abnormal vehicle conditions and whether the reminding device has left the vehicle by a predetermined distance. In Step 454, if both of the two conditions that the vehicle condition is abnormal and the distance between the reminding device and the vehicle has exceeded a predetermined value are satisfied, the method proceeds to Step 456. However, in Step 454, if at least one of the two conditions that the vehicle condition is abnormal and the distance between the reminding device and the vehicle has exceeded a predetermined value is not satisfied, the method returns to Step 452, that is, the reminding device continues to process and monitor the vehicle condition data, and will not remind the user at the same time.

Turning to FIG. 6, a vehicle condition reminding method according to another embodiment of the invention is shown, which is slightly different from the method shown in FIG. 5. It should be noted that the method of this embodiment can be used for vehicle condition reminding systems with different hardware or structures, including but not limited to the two vehicle condition reminding systems shown in FIG. 1 and FIG. 2. Specifically, Steps 550, 551, 553, and 556 in FIG. 6 are substantially the same as Steps 450, 451, 453, and 456 in FIG. 5, respectively. However, in Step 554 in FIG. 5, the determination of the distance between the vehicle (vehicle condition detecting device) and the reminding device is performed by the vehicle condition detecting device rather than the reminding device. In Step 554, if the vehicle condition detecting device determines that the user has been left the vehicle by at least a predetermined distance, and the reminding device also detects that the vehicle condition is abnormal, then the method will proceed to Step 556. Otherwise, the method will return to Step 552.

Therefore, after introducing several embodiments, those skilled in the art may recognize that different modifications, additional structures, and equivalents can be used without departing from the essence of the invention. Accordingly, the above description should not be taken as limiting the scope of the invention as determined by the following claims.

For example, in the embodiments described above in FIGS. 1 and 2, the vehicle condition reminding system uses the OBD interface to communicate with the OBD system equipped on the vehicle to obtain data about the vehicle condition. However, in addition to the OBD interface, the invention can also use other types of interfaces, protocols, or buses to obtain vehicle condition information. For example, a private protocol can be used for communication between the vehicle and the vehicle condition detecting device. The vehicle condition detecting device may also be connected to the vehicle through permanent fixed wiring, and such fixed wiring is part of the vehicle circuit.

In addition, although the above embodiments use a dedicated reminding device, those skilled in the art need to understand that other devices can also be used as reminding devices. For example, a smartphone, tablet computer, smart watch, etc. owned by the user can be used as a reminding device, as long as they can communicate with the vehicle condition detecting device of the invention, especially using short-range wireless communication.

In the case of a dedicated reminding device, the structure and function of the reminding device can be simplified as much as possible in order to save costs and reduce user misuse. For example, the reminding device may not have a user input module, so that the user can only passively get the warning, and if the prompt is to be eliminated, the user must return to the vehicle to troubleshoot abnormal vehicle conditions. In addition, the reminding device may not have the ability to access the mobile phone network, but can only communicate with the vehicle condition detecting device through short-range wireless communication.

The above-mentioned abnormal vehicle conditions may be various situations that affect the anti-theft safety of the vehicle itself or cause adverse consequences to the safe parking of the vehicle, for example, one or more doors are not closed, the trunk is not closed, the sunroof is not completely closed, one or more lights are not turned off, the engine is not turned off, one or more windows are not fully raised, and the handbrake is not pulled properly.

What is claimed is:

1. A vehicle condition reminding method, comprising the following steps:
   detecting a vehicle condition of a vehicle;
   when a user leaves the vehicle by at least a predetermined distance, and the vehicle condition is abnormal, reminding the user of the abnormal vehicle condition;
   wherein in the reminding step, a reminder adapted to be carried by the user sends a warning based on that the user leaves the vehicle by at least a predetermined distance and the vehicle condition is abnormal; and
   wherein the reminder has at least one of the following characteristics:
      the reminder does not have a user input device; and
      the reminder does not have the ability to join a mobile phone network or Wi-Fi;
   wherein the detecting step is performed by a vehicle condition detecting device provided in the vehicle;
   wherein determining whether the vehicle condition is abnormal is performed by a reminding device through receiving the vehicle condition information sent by the vehicle condition detecting device in a wireless communication manner.

2. The method of claim 1, wherein the vehicle condition detecting device is 1) an independent detecting device externally connected to an OBD interface of the vehicle, 2) a vehicle driving computer, or 3) an on-board safety device.

3. The method of claim 1, wherein determining whether the vehicle condition is abnormal is performed by the vehicle condition detecting device.

4. The method of claim 1, wherein determining whether the user leaves the vehicle by at least a predetermined distance is performed by the vehicle condition detecting device through wireless communicating with the reminding device adapted to be carried by the user.

5. The method according to claim 1, wherein determining whether the user leaves the vehicle by at least a predetermined distance is performed by the reminding device through wireless communicating with the vehicle condition detecting device.

6. The method of claim 1, wherein the abnormal vehicle condition includes one or more vehicle conditions selected from the group consisting of: one or more doors are not closed, the trunk is not tightly closed, the sunroof is not fully closed, one or more lights are not turned off, the engine is not turned off, one or more windows are not fully raised, and the handbrake is not pulled properly.

7. The method according to claim 1, wherein the reminding device is a vehicle remote key, a key fob, a portable reminding terminal or a smart terminal.

8. A vehicle condition reminding system, comprising:
   a vehicle condition detecting device adapted to connect to a vehicle;
   a reminding device adapted to be carried by a user; the reminding device adapted to be wirelessly communicating with the vehicle condition detecting device;
   wherein, the reminding device is configured to send a warning to the user when receiving or determining that the vehicle condition is abnormal, and that the reminding device leaves the vehicle by at least a predetermined distance;
   wherein the reminder has at least one of the following characteristics:
      the reminder does not have a user input device; and
      the reminder does not have the ability to join a mobile phone network or Wi-Fi;
   wherein the vehicle condition detecting device is configured to detect the vehicle condition of the vehicle, and send vehicle condition information to the reminding device; the reminding device determining whether the abnormal vehicle condition occurs through receiving the vehicle condition information sent by the vehicle condition detecting device.

9. The vehicle condition reminding system according to claim 8, wherein the vehicle condition detecting device is 1) an independent detecting device externally connected to an OBD interface of the vehicle, 2) a vehicle driving computer, or 3) an on-board safety device.

10. The vehicle condition reminding system according to claim 8, wherein the vehicle condition detecting device is configured to detect the vehicle condition of the vehicle, determine whether the vehicle condition is abnormal, and send a vehicle condition abnormal signal to the reminding device.

11. The vehicle condition reminding system according to claim 8, wherein the vehicle condition detecting device determines whether the user leaves the vehicle by at least a predetermined distance through wirelessly communicating with the reminding device.

12. The vehicle condition reminding system of claim 8, wherein the reminding device determines whether the user leaves the vehicle by at least a predetermined distance through wirelessly communicating with the vehicle condition detecting device.

13. The vehicle condition reminding system of claim 8, wherein the abnormal vehicle condition includes one or more vehicle conditions selected from the group consisting of: one or more doors are not closed, the trunk is not tightly closed, the sunroof is not fully closed, one or more lights are not turned off, the engine is not turned off, one or more windows are not fully raised, and the handbrake is not pulled properly.

14. The vehicle condition reminding system according to claim 8, wherein the reminding device is a vehicle remote key, a key fob, a portable reminding terminal or a smart terminal.

15. A reminding apparatus, including a reminding device adapted to be carried by a user; the reminding device adapted to receive or determine information sent by a vehicle condition detecting device connected to a vehicle through wireless communication, and adapted to send a warning to the user; the reminding device not having a user input device, or the reminding device not having the ability to access the mobile phone network;
   where the reminding device is configured to send a warning to the user when receiving or determining that the vehicle condition is abnormal, and the reminding device leaves the vehicle by at least a predetermined distance; the reminding device determines whether the user leaves the vehicle by a predetermined distance through wireless communicating between the reminding device and the vehicle condition detecting device.

16. The reminding apparatus of claim 15, wherein the abnormal vehicle condition includes one or more vehicle conditions selected from the group consisting of: one or more doors are not closed, the trunk is not tightly closed, the sunroof is not fully closed, one or more lights are not turned off, the engine is not turned off, one or more windows are not fully raised, and the handbrake is not pulled properly.

17. A vehicle condition reminding method, comprising the following steps:
- detecting a vehicle condition of a vehicle;
- when a user leaves the vehicle by at least a predetermined distance, and the vehicle condition is abnormal, reminding the user of the abnormal vehicle condition;
- wherein in the reminding step, a reminder adapted to be carried by the user sends a warning based on that the user leaves the vehicle by at least a predetermined distance and the vehicle condition is abnormal; and
- wherein the reminder has at least one of the following characteristics:
  - the reminder does not have a user input device; and
  - the reminder does not have the ability to join a mobile phone network or Wi-Fi;
- wherein determining whether the user leaves the vehicle by at least a predetermined distance is performed by a reminding device through wireless communicating with a vehicle condition detecting device.

18. A vehicle condition reminding system, comprising:
- a vehicle condition detecting device adapted to connect to a vehicle;
- a reminding device adapted to be carried by a user; the reminding device adapted to be wirelessly communicating with the vehicle condition detecting device;
- wherein, the reminding device is configured to send a warning to the user when receiving or determining that the vehicle condition is abnormal, and that the reminding device leaves the vehicle by at least a predetermined distance;
- wherein the reminder has at least one of the following characteristics:
  - the reminder does not have a user input device; and
  - the reminder does not have the ability to join a mobile phone network or Wi-Fi;
- wherein the reminding device determines whether the user leaves the vehicle by at least a predetermined distance through wirelessly communicating with the vehicle condition detecting device.

19. The method according to claim 17, wherein the detecting step is performed by a vehicle condition detecting device provided in the vehicle.

20. The method of claim 17, wherein the vehicle condition detecting device is 1) an independent detecting device externally connected to an OBD interface of the vehicle, 2) a vehicle driving computer, or 3) an on-board safety device.

21. The vehicle condition reminding system according to claim 18, wherein the vehicle condition detecting device is 1) an independent detecting device externally connected to an OBD interface of the vehicle, 2) a vehicle driving computer, or 3) an on-board safety device.

22. The vehicle condition reminding system according to claim 18, wherein the vehicle condition detecting device is configured to detect the vehicle condition of the vehicle, determine whether the vehicle condition is abnormal, and send a vehicle condition abnormal signal to the reminding device.

* * * * *